United States Patent
Ron et al.

(10) Patent No.: US 8,412,226 B2
(45) Date of Patent: Apr. 2, 2013

(54) MOBILE PHONE LOCATOR

(75) Inventors: Uri Ron, Tel Aviv (IL); Eyal Bychkov, Hod Hasharon (IL); Itay Sherman, Hod Hasharon (IL); Nataly Kremer, Tel Aviv (IL)

(73) Assignee: Google Inc., Mountain View, CA (US)

( * ) Notice: Subject to any disclaimer, the term of this patent is extended or adjusted under 35 U.S.C. 154(b) by 704 days.

(21) Appl. No.: 12/144,671

(22) Filed: Jun. 24, 2008

(65) Prior Publication Data
US 2009/0318197 A1   Dec. 24, 2009

(51) Int. Cl.
*H04W 24/00* (2009.01)
*H04W 4/00* (2009.01)
*G06F 17/21* (2006.01)

(52) U.S. Cl. .................. 455/456.1; 455/456.2; 455/466; 340/539.1; 340/539.13; 342/457; 370/338; 715/255

(58) Field of Classification Search .................. 455/567, 455/456.1, 456.2, 466; 340/539.1, 539.13; 370/338; 715/255; 342/457
See application file for complete search history.

(56) References Cited

U.S. PATENT DOCUMENTS

| | | | |
|---|---|---|---|
| 5,625,673 A | 4/1997 | Grewe et al. | |
| 5,628,055 A | 5/1997 | Stein | |
| 5,809,115 A | 9/1998 | Inkinen | |
| 5,893,037 A | 4/1999 | Reele et al. | |
| 5,907,815 A | 5/1999 | Grimm et al. | |
| 6,188,917 B1 | 2/2001 | Laureanti | |
| 6,201,867 B1 | 3/2001 | Koike | |
| 6,243,578 B1 | 6/2001 | Koike | |
| 6,477,357 B1 | 11/2002 | Cook | |
| 6,516,202 B1 | 2/2003 | Hawkins et al. | |
| 6,565,608 B1 * | 5/2003 | Fein et al. | 715/255 |
| 6,640,113 B1 | 10/2003 | Shin et al. | |
| 6,690,947 B1 | 2/2004 | Tom | |
| 6,696,941 B2 * | 2/2004 | Baker | 340/539.1 |
| 6,898,283 B2 | 5/2005 | Wycherley et al. | |
| 6,907,264 B1 | 6/2005 | Sterkel | |
| 6,952,181 B2 * | 10/2005 | Karr et al. | 342/457 |
| 6,999,792 B2 | 2/2006 | Warren | |
| 7,085,542 B2 | 8/2006 | Dietrich et al. | |
| 7,194,285 B2 | 3/2007 | Tom | |
| 7,266,391 B2 | 9/2007 | Warren | |
| 7,308,272 B1 * | 12/2007 | Wortham | 455/456.1 |
| 2002/0090980 A1 | 7/2002 | Wilcox et al. | |
| 2002/0151327 A1 | 10/2002 | Levitt | |

(Continued)

FOREIGN PATENT DOCUMENTS

| EP | 1871075 A1 | 12/2007 |
|---|---|---|
| WO | 9421058 A1 | 9/1994 |

(Continued)

OTHER PUBLICATIONS

Helleseth, H., Wi-Fi Security, How to Break and Exploit, Thesis for the degree Master of Science, Department of Informatics, University of Bergen, Jun. 2006.

*Primary Examiner* — William D Cumming
(74) *Attorney, Agent, or Firm* — Soquel Group LLC

(57) ABSTRACT

A method for locating a misplaced mobile phone, including receiving, by a mobile phone, a transmitted message, identifying, by the mobile phone, the transmitted message as being an alert request, and in response to the identifying, generating, by the mobile phone, an alert. A mobile phone is also described and claimed.

50 Claims, 2 Drawing Sheets

U.S. PATENT DOCUMENTS

| | | |
|---|---|---|
| 2004/0233930 A1 | 11/2004 | Colby, Jr. |
| 2004/0268005 A1 | 12/2004 | Dickie |
| 2005/0070225 A1 | 3/2005 | Lee |
| 2005/0159184 A1 | 7/2005 | Kerner et al. |
| 2006/0003804 A1 | 1/2006 | Liu |
| 2006/0025158 A1* | 2/2006 | Leblanc et al. ............ 455/456.2 |
| 2006/0105722 A1 | 5/2006 | Kumar |
| 2006/0241353 A1 | 10/2006 | Makino et al. |
| 2007/0004450 A1 | 1/2007 | Parikh |
| 2007/0018957 A1 | 1/2007 | Seo |
| 2007/0072620 A1 | 3/2007 | Levitan |
| 2007/0077924 A1 | 4/2007 | Bhogal et al. |
| 2007/0079030 A1 | 4/2007 | Okuley et al. |
| 2007/0105572 A1* | 5/2007 | Kim .............................. 455/466 |
| 2007/0161404 A1 | 7/2007 | Yasujima et al. |
| 2007/0288583 A1 | 12/2007 | Rensin et al. |
| 2008/0009325 A1 | 1/2008 | Zinn et al. |
| 2008/0026794 A1 | 1/2008 | Warren |
| 2008/0040354 A1 | 2/2008 | Ray et al. |
| 2008/0130604 A1* | 6/2008 | Boyd ........................... 370/338 |
| 2008/0140886 A1 | 6/2008 | Izutsu |
| 2008/0186162 A1* | 8/2008 | Rajan et al. .............. 340/539.13 |

FOREIGN PATENT DOCUMENTS

| | | |
|---|---|---|
| WO | 0059247 A1 | 10/2000 |
| WO | 0186922 A1 | 11/2001 |
| WO | 03103174 A1 | 12/2003 |

* cited by examiner

MOBILE PHONE LOCATOR

FIELD OF THE INVENTION

The field of the present invention is mobile phones.

BACKGROUND OF THE INVENTION

A common problem that arises with mobile electronic devices is locating a misplaced device. Cell phones, for example, are notorious for getting lost.

Conventionally there are two types of methods for locating a misplaced phone. One method, used primarily with cordless phones, involves paging the cordless phone from the phone's base station. When paged, the cordless phone generates an audible alert which enables a user to find the phone. This method generally does not apply to cell phones, since although cell phones are paged by operators via base stations, they do not have personal base station paging capability.

Another method for locating a misplaced phone is to call the phone from another phone. The misplaced phone can be tracked by its ringing sound. This method is commonly used for locating cell phones. However, this method does not work if the misplaced phone has been set to an inaudible ring mode, such as a silent or vibrating ring, or to a very low volume ring.

US Patent Application Publication No. 2007/0072620 A1 of Levitan, entitled SYSTEM AND METHOD FOR RECOVERING A LOST OR STOLEN WIRELESS DEVICE, describes use of a location server for storing user-associated location information. U.S. Patent Application No. 2007/0077924 A1 of Bhogal et al., entitled SYSTEM AND METHOD TO LOCATE MOBILE DEVICES HAVING INAUDIBLE SETTINGS, describes remotely adjusting the ring tone volume of a mobile phone, so that the ring tone is audible enough for a user to hear it. According to Bhogal et al., a user calls his misplaced phone from another phone. Upon connection to his misplaced phone, the user has command options to remotely change the misplaced phone's ring tone volume.

SUMMARY OF THE DESCRIPTION

Aspects of the present invention provide a method and system for locating a misplaced phone by sending an alert request message to the phone. The alert request message may be sent as an SMS or MMS message. Alternatively, the alert request message may be sent via BLUETOOTH® or via Wi-Fi. Yet alternatively, the alert request message may be sent via Wireless Application Protocol (WAP) from a mobile phone or from a PDA. Yet alternatively, the alert request message may be sent via a web server.

In response to receipt of the alert request message, the mobile phone sounds an audible alert, irrespective of whether the phone is set to silent, vibrate or audible ring mode. In addition, the phone may display a pre-designated message, such as "Please contact John at 123-456-7890", so that whoever finds the phone knows how to contact its owner. The phone may also play a pre-designated audio or video segment. The phone may also vibrate.

There is thus provided in accordance with an embodiment of the present invention a method for locating a misplaced mobile phone, including receiving, by a mobile phone, a transmitted message, identifying, by the mobile phone, the transmitted message as being an alert request, and in response to the identifying, generating, by the mobile phone, an alert.

There is additionally provided in accordance with an embodiment of the present invention a mobile phone, including a receiver for receiving a transmitted message, a message parser, coupled with the receiver, for identifying the transmitted message as being an alert request, and at least one speaker, coupled with the message parser, for sounding an audible alert, in response to the message parser identifying the alert request.

There is further provided in accordance with an embodiment of the present invention a method for locating a misplaced electronic communication device, including receiving, by an electronic communication device, a transmitted message, identifying, by the electronic communication device, the transmitted message as being an alert request, and in response to the identifying, generating, by the electronic communication device, an alert.

There is yet further provided in accordance with an embodiment of the present invention an electronic communication device, including a receiver for receiving a transmitted message a message parser, coupled with the receiver, for identifying the transmitted message as being an alert request, and at least one speaker, coupled with the message parser, for sounding an audible alert in response to the message parser identifying the alert request.

BRIEF DESCRIPTION OF THE DRAWINGS

The present invention will be more fully understood and appreciated from the following detailed description, taken in conjunction with the drawings in which.

DETAILED DESCRIPTION

Aspects of the present invention relate to locating a misplaced mobile phone.

Figure 1:
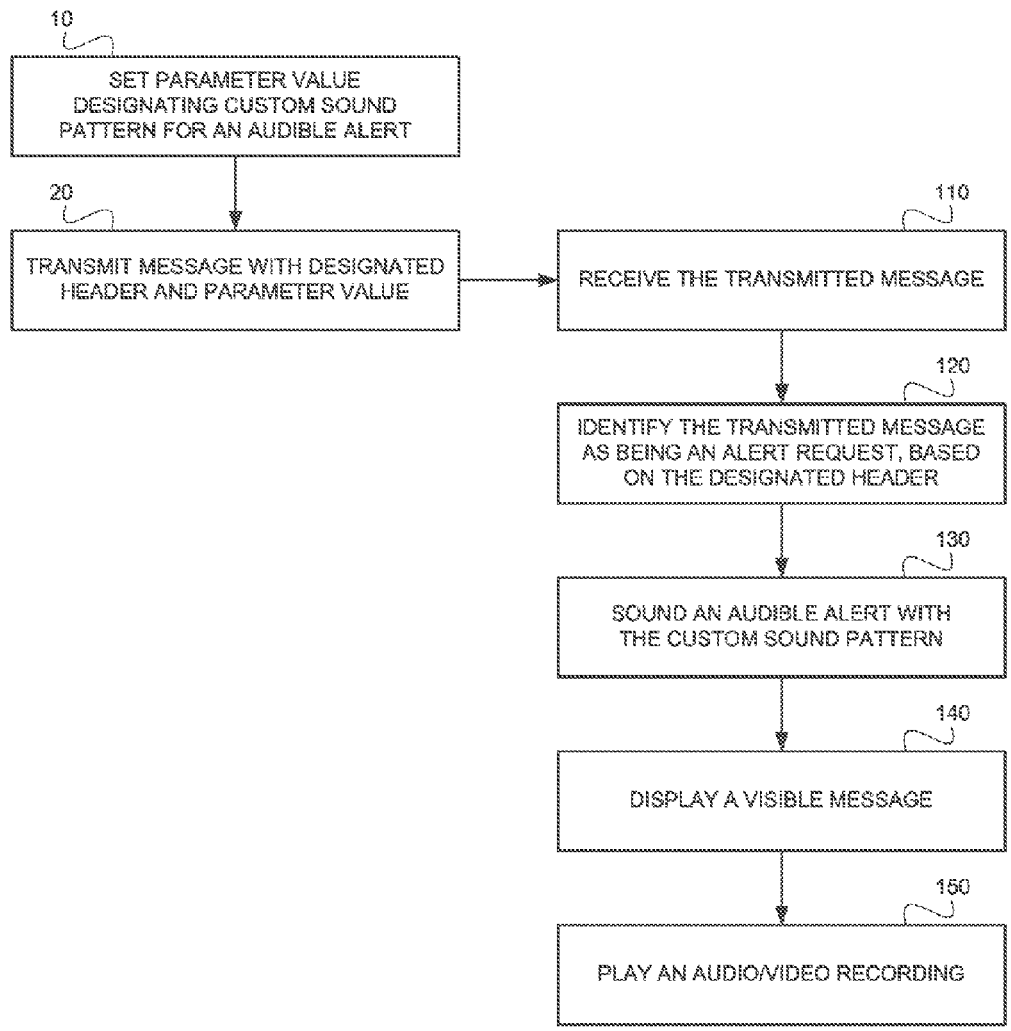
FIG. 1 is a simplified flowchart of a method for locating a misplaced phone, in accordance with an embodiment of the present invention.

Reference is now made to FIG. 1, which is a simplified flowchart of a method for locating a misplace phone, in accordance with an embodiment of the present invention. The method of FIG. 1 is performed by a mobile phone. At step 110 the mobile phone receives a transmitted message. At step 120 the mobile phone parses the transmitted message and identifies the message as being an alert request.

Generally, an alert request includes a recognizable header and one or more parameter values. A user, at step 10, sets the parameter values by means of a message editor, such as message editor 201 (FIG. 2), to specify how the mobile phone responds to an alert request. A sample alert request is "LocateMyPhone <personal identification #><time><volume><alert type>", where the personal identification # parameter is a unique ID for the user, the time parameter designates a time duration for an audible alert, the volume parameter designates a sound volume for an audible alert, and the alert type parameter designates a sound pattern for an audible alert.

A sound pattern may be, for example, a repetitive "3 beeps +silence" pattern, or a rising volume alert that starts with an initial volume and increases the volume over time.

If the time parameter is not set, then the audible alert may be sounded for a default amount of time, or alternatively may be sounded until manually stopped. If the volume parameter is not set, then the audible alert may be sounded at a default sound volume. If the alert type parameter is not set, then the alert may be sounded according to a default sound pattern.

If the transmitted message is identified at step 120 as being an alert request, then at step 130 the mobile phone sounds an audible alert. The time, volume and alert type parameters described above govern the audible alert sounded at step 130. In addition, at step 140 the mobile phone displays a visible pre-designated message, such as "Please contact John at 123-456-7890" so that whoever finds the phone knows how to contact its owner. The pre-designated message displayed at step 140 may also be set using a parameter value.

Optionally, at step 150 the mobile phone may play a pre-designated audio/video recording, in addition to or instead of displaying the pre-designated message at step 140. As above, the pre-designated audio/video recording may be set using a parameter value. The pre-designated audio/video recording may indicate that the phone is lost, and describe how to contact the phone's owner.

Optionally, the mobile phone may vibrate, so as to assist people in finding it.

According to various embodiments of the present invention, the transmitted message received at step 110 may be transmitted at step 20, by means of a transmitter such as transmitter 202 (FIG. 2), in a number of different ways. The transmitted message may be transmitted inter alia as an SMS message, or as an MMS message. Use of an MMS message facilitates transmission of a pre-designated audio/video recording.

The transmitted message may be transmitted via Wireless Application Protocol (WAP) from a mobile phone or from a PDA.

The transmitted message may be transmitted via a web server.

The transmitted message may be transmitted over a BLUETOOTH® connection, or over a Wi-Fi connection. For BLUETOOTH® transmission, the transmitted message may be sent as a vCard, which generally includes a message in the name field, from a BLUETOOTH® transmitter to the mobile phone using the Object Exchange (OBEX) protocol. BLUETOOTH® generally has a limited range of approximately 10 meters, for transmissions made by a mobile phone, and has a larger range of up to 200 meters for transmissions made by computers with Class 1 transmitters.

For Wi-Fi transmission, the transmitted message may be included in a data section of an element of an 802.11 IEEE standard beacon. Beacon element ID 221 in the 802.11 standard is a vendor-specific element and, as such, can be used for adding data to the Wi-Fi protocol. In accordance with an embodiment of the present invention, the alert request message may be embedded in the data section of element ID 221, as follows.

| Element ID 221 in 802.11 Beacon | |
| --- | --- |
| Field | Value |
| Element ID | 221 |
| Length | |
| OUI | Hex vendor code |
| Data | Alert request message |

The field OUI represents a three-octet Organizationally Unique Identifier. For example, the OUI for Microsoft Corporation is 00:50:f2. The OUI is unique for each vendor. It will thus be appreciated by those skilled in the art that for Wi-Fi transmission, step 120 may be performed using an 802.11 protocol sniffer that captures a beacon from a wireless access point, searches for element ID 221, and determines whether or not the data field contains an alert request message.

Figure 2:
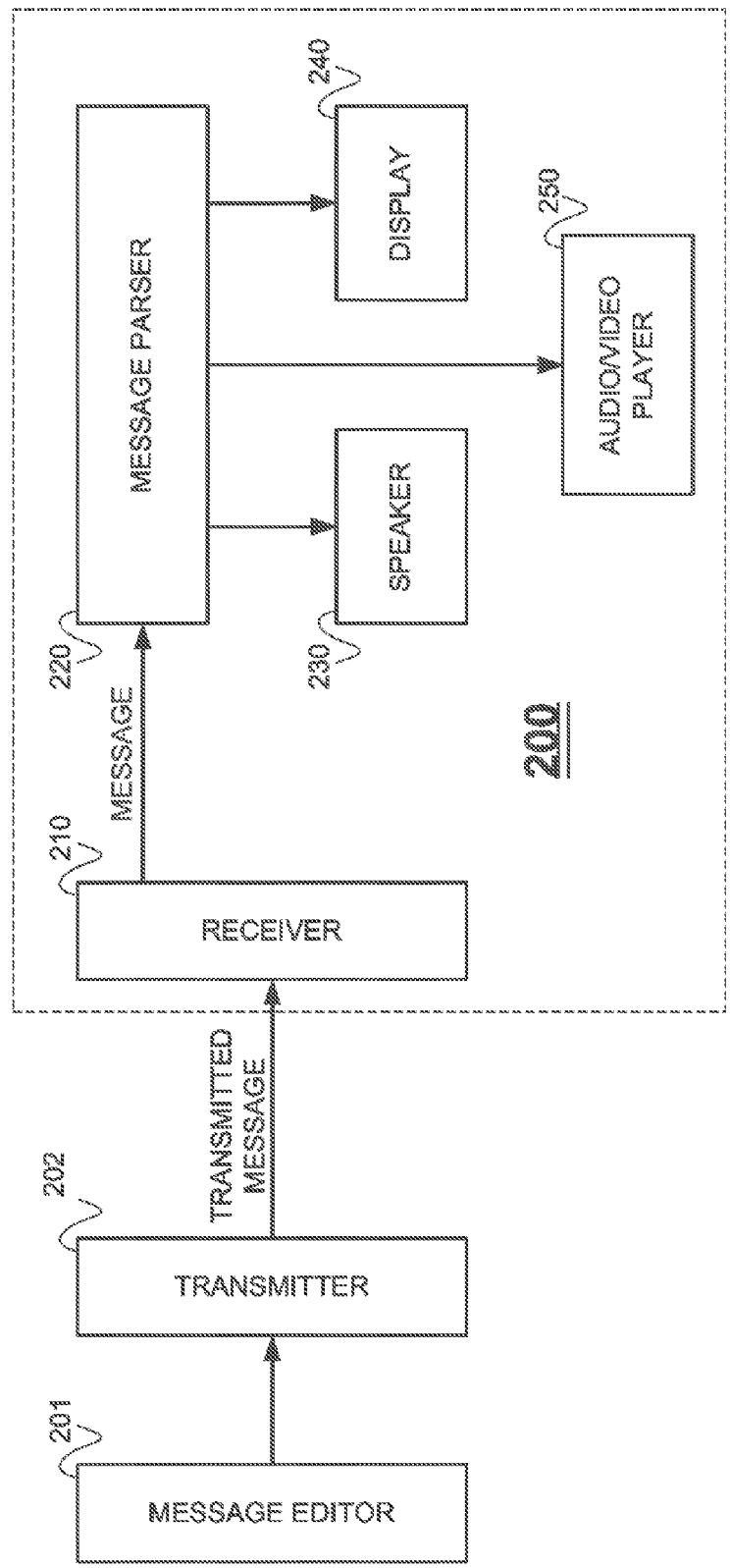
FIG. 2 is a simplified block diagram of a mobile phone with circuitry for generating an alert that aids in locating the phone, in accordance with an embodiment of the present invention.

Reference is now made to FIG. 2, which is a simplified block diagram of a mobile phone 200 with circuitry for generating an alert that aids in locating the phone, in accordance with an embodiment of the present invention. As shown in FIG. 2, mobile phone 200 includes a receiver 210, a message parser 220, at least one speaker 230, a display 240 and an optional audio/video player 250. Receiver 210 receives a transmitted message and forwards the message to message parser 220. Receiver 210 may be inter alia an SMS message receiver or an MMS message receiver. Receiver 210 may be inter alia a BLUETOOTH® receiver or a Wi-Fi receiver.

Message parser 220 receives a message as input, parses the message to determine whether or not the message is an alert request, and generates as output an indicator if the message is an alert request.

Speaker(s) 230 receives as input the indicator from message parser 220 and generates as output an audible alert. As indicated hereinabove, the alert request may include parameter values that govern the time duration, sound volume and sound pattern of the audible alert. Display 240 receives as input the indicator from message parser 220, and generates as output a pre-designated display message. As indicated hereinabove, the pre-designated display message may be a parameter value in the alert request. Audio/video player 250 receives as input the indicator from message parser 220, and generates as output a pre-designated audio/video recording.

In reading the above description, persons skilled in the art will realize that there are many apparent variations that can be applied to the methods and systems described. Thus it may be appreciated from FIGS. 1 and 2 that embodiments of the present invention are not limited to mobile phones, and apply generally to electronic devices that have communication capability, such as portable digital assistants (PDAs) and pagers.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for locating a mobile phone, the method comprising:

setting at least one parameter value for an alert request intended for a mobile phone, wherein the at least one parameter value designates a custom sound pattern for an audible alert, and wherein the custom sound pattern is distinct from any ringtones stored in the mobile phone;

transmitting a message to the mobile phone, wherein the message includes a designated header and the at least one parameter value;

receiving, by the mobile phone, the transmitted message;

identifying, by the mobile phone, the message as being an alert request based on the designated header; and in response to said identifying, generating, by the mobile phone, the custom sound pattern in accordance with the at least one.

2. The method of claim 1 wherein said generating an alert comprises sounding an audible alert for a pre-designated amount of time.

3. The method of claim 1 wherein said generating an alert comprises sounding an audible alert at a pre-designated volume.

4. The method of claim 1 wherein said generating an alert comprises sounding an audible alert according to a pre-designated sound pattern.

5. The method of claim 1 wherein said generating an alert comprises emitting light.

6. The method of claim 1 wherein said generating an alert comprises vibrating the mobile phone.

7. The method of claim 1 further comprising, in response to said identifying, displaying, by the mobile phone, a pre-designated image.

8. The method of claim 1 further comprising, in response to said identifying, playing, by the mobile phone, a pre-designated audio recording.

9. The method of claim 1 further comprising, in response to said identifying, playing, by the mobile phone, a pre-designated video recording.

10. The method of claim 1 wherein the transmitted message is an MMS message.

11. The method of claim 1 wherein the transmitted message is transmitted via an unlicensed wireless network.

12. The method of claim 1 wherein the transmitted message is transmitted via a Wi-Fi network.

13. The method of claim 1 wherein the transmitted message is transmitted via a web server.

14. The method of claim 1 wherein the transmitted message is transmitted via Wireless Application Protocol (WAP).

15. A system comprising:
a message editor for setting at least one parameter value for an alert request intended for a mobile phone, wherein the at least one parameter value designates a custom sound pattern for an audible alert, and wherein the custom sound pattern is distinct from any ringtones stored in the mobile phone;
a transmitter for transmitting a message to the mobile phone, wherein the message includes a designated header and the at least one parameter value; and
a mobile phone, comprising:
a receiver for receiving the message from said transmitter;
message parser circuitry, coupled with said receiver, for identifying the message as being an alert request based on the designated header; and
at least one speaker, coupled with said message parser circuitry, for sounding the custom sound pattern in accordance with the at least one parameter value, in response to said message parser identifying the alert request.

16. The mobile phone of claim 15 wherein said at least one speaker sounds the audible alert for a pre-designated amount of time.

17. The mobile phone of claim 15 wherein said at least one speaker sounds the audible alert at a pre-designated volume.

18. The mobile phone of claim 15 wherein said at least one speaker sounds the audible alert according to a pre-designated sound pattern.

19. The mobile phone of claim 15 further comprising a display, coupled with said message parser, for displaying a pre-designated image in response to said message parser identifying the alert request.

20. The mobile phone of claim 15 further comprising a light emitter, coupled with said message parser, for emitting light in response to said message parser identifying the alert request.

21. The mobile phone of claim 15 further comprising a vibrator, coupled with said message parser, for vibrating the mobile phone in response to said message parser identifying the alert request.

22. The mobile phone of claim 15 further comprising an audio player for playing a pre-designated audio recording, in response to said message parser identifying the alert request.

23. The mobile phone of claim 15 further comprising a video player for playing a pre-designated video recording, in response to said message parser identifying the alert request.

24. The mobile phone of claim 15 wherein said receiver is an MMS message receiver.

25. The mobile phone of claim 15 wherein said receiver comprises a short range radio receiver.

26. The mobile phone of claim 15 wherein the short range radio receiver comprises a Wi-Fi receiver.

27. A method for locating an electronic communication device, the method comprising:
setting at least one parameter value for an alert request intended for an electronic communication device, wherein the at least one parameter value designates a custom sound pattern for an audible alert, and wherein the custom sound pattern is distinct from any ringtones stored in the electronic communication device;
transmitting a message to the electronic communication device, wherein the message includes a designated header and the at least one parameter value;
receiving, by the electronic communication device, the transmitted message;
identifying, by the electronic communication device, the message as being an alert request based on the designated header; and
in response to said identifying, generating, by the electronic communication device, the custom sound pattern in accordance with the at least one parameter value.

28. A system comprising:
a message editor for setting at least one parameter value for an alert request intended for an electronic communication device, wherein the at least one parameter value designates a custom sound pattern for an audible alert, and wherein the custom sound pattern is distinct from any ringtones stored in the electronic communication device;
a transmitter for transmitting a message to the electronic communication device, wherein the message includes a designated header and the at least one parameter value; and
an electronic communication device, comprising:
a receiver for receiving the message from said transmitter;
message parser circuitry, coupled with said receiver, for identifying the message as being an alert request based on the designated header; and
at least one speaker, coupled with said message parser circuitry, for sounding the custom sound pattern in accordance with the at least one parameter value, in response to said message parser identifying the alert request.

29. The system of claim 28 wherein said electronic communication device is a portable digital assistant (PDA).

30. The system of claim 28 wherein said electronic communication device is a pager.

31. The method of claim 1 wherein the received message is transmitted via Wi-Fi.

32. The method of claim 31 wherein said identifying identifies the alert request within a data section of a beacon frame.

33. The method of claim 1 wherein the at least one dynamic alert setting parameter value indicates a time duration for an audible alert.

34. The method of claim 1 wherein the at least one dynamic alert setting parameter value indicates a volume for an audible alert.

35. The method of claim 1 wherein the at least one dynamic alert setting parameter values indicates a sound pattern for an audible alert.

36. The mobile phone of claim 15 wherein the received message is transmitted via Wi-Fi.

37. The mobile phone of claim 36 wherein said message parser identifies the alert request within a data section of a beacon frame.

38. The method of claim 15 wherein the at least one dynamic alert setting parameter value indicates a time duration for an audible alert.

39. The method of claim 15 wherein the at least one dynamic alert setting parameter value indicates a volume for an audible alert.

40. The method of claim 15 wherein the at least one dynamic alert setting parameter values indicates a sound pattern for an audible alert.

41. The method of claim 27 wherein the received message is transmitted via Wi-Fi.

42. The method of claim 41 wherein said identifying identifies the alert request within a data section of a beacon frame.

43. The method of claim 27 wherein the at least one dynamic alert setting parameter value indicates a time duration for an audible alert.

44. The method of claim 27 wherein the at least one dynamic alert setting parameter value indicates a volume for an audible alert.

45. The method of claim 27 wherein the at least one dynamic alert setting parameter values indicates a sound pattern for an audible alert.

46. The electronic communication device of claim 28 wherein the received message is transmitted via Wi-Fi.

47. The electronic communication device of claim 46 wherein said message parser identifies the alert request within a data section of a beacon frame.

48. The method of claim 28 wherein the at least one dynamic alert setting parameter value indicates a time duration for an audible alert.

49. The method of claim 28 wherein the at least one dynamic alert setting parameter value indicates a volume for an audible alert.

50. The method of claim 28 wherein the at least one dynamic alert setting parameter values indicates a sound pattern for an audible alert.

* * * * *

UNITED STATES PATENT AND TRADEMARK OFFICE
CERTIFICATE OF CORRECTION

| | | |
|---|---|---|
| PATENT NO. | : 8,412,226 B2 | |
| APPLICATION NO. | : 12/144671 | |
| DATED | : April 2, 2013 | |
| INVENTOR(S) | : Ron et al. | |

It is certified that error appears in the above-identified patent and that said Letters Patent is hereby corrected as shown below:

In the Claims:

Column 5, line 3, please replace "at least one" with -- at least one parameter value --

Signed and Sealed this
Twenty-first Day of May, 2013

Teresa Stanek Rea
*Acting Director of the United States Patent and Trademark Office*